C. D. HIBBS.
MACHINE FOR CUTTING TIRE CASING TREADS AND REMOVING BEADS.
APPLICATION FILED JUNE 2, 1919. RENEWED MAR. 5, 1921.
1,392,330. Patented Oct. 4, 1921.
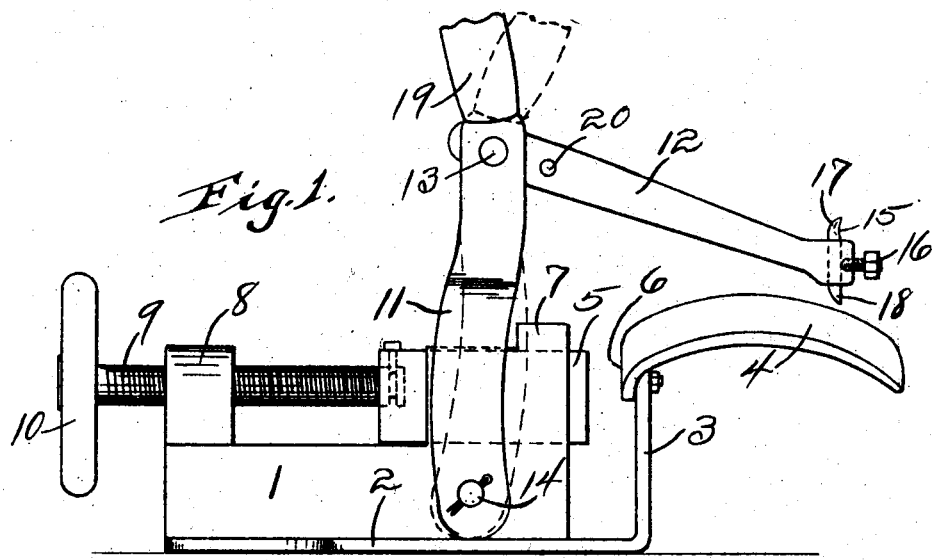
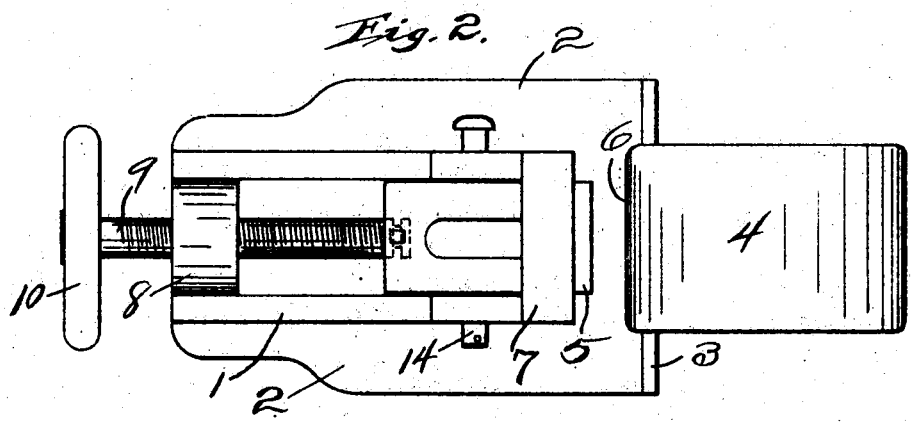
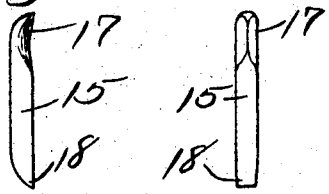
Inventor
C.D. HIBBS.
By A. L. Jackson
Attorney
Witness
J. E. Melton.

UNITED STATES PATENT OFFICE.

CASSELL D. HIBBS, OF FORT WORTH, TEXAS.

MACHINE FOR CUTTING TIRE-CASING TREADS AND REMOVING BEADS.

1,392,330. Specification of Letters Patent. Patented Oct. 4, 1921.

Application filed June 2, 1919, Serial No. 301,151. Renewed March 5, 1921. Serial No. 449,743.

*To all whom it may concern:*

Be it known that I, CASSELL D. HIBBS, a citizen of the United States of America, residing at Fort Worth, in the county of Tarrant and State of Texas, have invented certain new and useful Improvements in Machines for Cutting Tire-Casing Treads and Removing Beads, of which the following is a specification.

My invention relates to machines for extracting beads and for cutting treads of tire casings, and the object is to provide a convenient device for operating on tire casings which are to be strip and separated into the original elements and to provide a device which will save much labor and avoid much expense. Other objects and advantages will be fully explained in the following description and the invention will be more particularly pointed out in the claims.

Reference is had to the accompanying drawings which form a part of this application.

Figure 1 is a side elevation of the device, showing by dotted outline the reversibility of one of the elements. Fig. 2 is a plan view of the same. Fig. 3 is a side elevation of the cutting tool. Fig. 4 is a face view of the same.

Similar characters of reference are used to indicate the same parts throughout the several views.

This machine or device is provided with a base frame 1 having flanges 2 for bolting the device to a convenient platform or table. The machine is also provided with a work holder consisting of an upstanding flange 3 to which is bolted a form 4 for receiving and holding a tire casing to be operated upon. A clamping member 5 for engaging the edge of a casing to clamp the same against the edge 6 of the form 4. The base frame 1 has a channel or way therethrough for the movement of the clamping member 5. A guard 7 holds the clamping plunger 5 against displacement. The base 1 has a screw-threaded bearing member 8 and a screw-threaded shaft 9 operates through the bearing member 8 and is provided with a hand-wheel 10 for driving the shaft 9. The shaft 9 has a swivel connection with the plunger 5, as shown by dotted outline in Figs. 1 and 2. It is apparent that this mode of moving the plunger is practically operative, but other means may be used to move the plunger 5. A swinging yoke 11 is pivotally mounted on the base member 1 and carries a tool holder 12. The yoke 11 is provided with a pivot shaft 14 which is removable and a bolt 13 which secures the tool holder 12 in the yoke is also removable. The object in making the pivot shaft 14 and the bolt 13 removable is to provide for reversing the yoke 11. The tool holder 12 carries a cutting or ripping blade 15. This blade is also reversible and is held in place by a set screw 16. One end 17 of the blade is adapted for cutting the treads of tire casings. The object of this action is to start the removal of the tread by a fabric stripping machine, not necessary to be herein shown. The other end 18 of the blade 15 is adapted for removing the treads of the tire casings. A handle 19 is provided for convenience in operating the yoke 11. The yoke 11 is curved to make the tool holder 12 reach over and stand above the casing which is placed on the work holder 4. Fig. 1 shows the device ready for ripping the beads from a tire casing. For cutting the treads, the shaft 14 is removed and the yoke is turned one hundred and eighty degrees. The bolt 13 is then removed so that the tool holder 12 may be adjusted for the treads. The tool holder 12 has more than one opening 20 so that the holder is adjustable for treads of different widths.

What I claim is,—

1. A tool for operating on tire casings comprising a frame having a channel therein, a casing support, a flange projecting from said frame and terminating with an upstanding member attached to said support, a plunger operating in said channel for clamping casings on said support, a blade holder and a blade carried thereby, and a swinging yoke mounted on said frame for adjusting and directing said blade holder.

2. A tool for operating on tire casings comprising a frame having a channel, a casing support, said frame having a flange projecting therefrom and terminating with an upstanding member spaced from the frame and attached to said support, a plunger operating in said channel, a blade holder and a reversible blade carried thereby, and a swinging reversible yoke pivotally mounted on said frame carrying said blade holder for adjusting and directing said blade holder.

3. A tool for operating on tire casings comprising a frame having a channel therein, a casing support attached to said frame and spaced therefrom, a plunger movable longitudinally in said channel for clamping casings on said support, a screw for operating said plunger, a blade holder and a reversible blade carried thereby, and a reversible yoke detachably and pivotally connected to said frame for carrying and directing said blade holder.

4. A tool for operating on tire casings comprising a frame having a channel therein open at one end and having a screw-threaded bearing in the other end, a plunger movable longitudinally in said channel and adapted to project through said open end out of said frame for pressing on tire casings and a screw shaft operating through said bearing and having a swivel connection with said plunger, a blade holder carrying a blade, and means for carrying and directing said blade holder.

5. A tool for operating on tire casings comprising a frame having a channel therein, a plunger movable longitudinally in said channel for engaging tire casings, a work support attached to said frame and spaced therefrom for coöperating with said plunger, a blade holder and a reversible blade carried thereby, a swinging reversible yoke detachably mounted on said frame for carrying and directing said blade holder, and a handle for actuating said yoke.

In testimony whereof I set my hand this 28th day of May, A. D. 1919.

CASSELL D. HIBBS.